US012683167B2

(12) United States Patent
Morimoto et al.

(10) Patent No.: US 12,683,167 B2
(45) Date of Patent: Jul. 14, 2026

(54) POLYIMIDE BINDER PRECURSOR COMPOSITION, AND POWER STORAGE DEVICE USING SAME

(71) Applicant: UBE Corporation, Ube (JP)

(72) Inventors: Keisuke Morimoto, Ube (JP); Nobu Iizumi, Ube (JP); Shohei Inoue, Ube (JP); Sousuke Honma, Ube (JP)

(73) Assignee: UBE CORPORATION, Ube (JP)

( * ) Notice: Subject to any disclaimer, the term of this patent is extended or adjusted under 35 U.S.C. 154(b) by 0 days.

(21) Appl. No.: 18/729,291

(22) PCT Filed: Jan. 18, 2023

(86) PCT No.: PCT/JP2023/001286
§ 371 (c)(1),
(2) Date: Jul. 16, 2024

(87) PCT Pub. No.: WO2023/140276
PCT Pub. Date: Jul. 27, 2023

(65) Prior Publication Data
US 2025/0112240 A1 Apr. 3, 2025

(30) Foreign Application Priority Data
Jan. 21, 2022 (JP) ................................ 2022-007980
Jun. 29, 2022 (JP) ................................ 2022-105139

(51) Int. Cl.
*H01M 4/62* (2006.01)
*C08G 73/10* (2006.01)
(Continued)

(52) U.S. Cl.
CPC ........ *H01M 4/622* (2013.01); *C08G 73/1032* (2013.01); *C08G 73/1042* (2013.01);
(Continued)

(58) Field of Classification Search
CPC ...... H01M 4/622; H01M 4/133; H01M 4/587; H01M 2004/027; C08G 73/1032;
(Continued)

(56) References Cited

U.S. PATENT DOCUMENTS

2006/0099506 A1 5/2006 Krause et al.
2014/0218875 A1 8/2014 Nakayama et al.
(Continued)

FOREIGN PATENT DOCUMENTS

JP 2009-170384 A 7/2009
JP 2016-066579 A 4/2016
(Continued)

OTHER PUBLICATIONS

Office Action in Japanese Patent Application No. 2023-575268 issued on Sep. 17, 2024 & English translation in 7 pages.
(Continued)

*Primary Examiner* — Daniel S Gatewood
(74) *Attorney, Agent, or Firm* — Knobbe Martens Olson & Bear LLP

(57) ABSTRACT

A polyimide binder from which a high-capacity power storage device, which has a small irreversible capacity and a high initial charge/discharge efficiency and is lightweight, can be obtained. The polyimide binder precursor composition is a polyimide binder precursor composition for a power storage device electrode, and includes a reaction product of a tetracarboxylic acid component and a diamine component, and a solvent. The polyimide binder obtained from the polyimide binder precursor composition has an irreversible capacity of 1200 mAh/g or less.

12 Claims, 1 Drawing Sheet

(51) Int. Cl.

| | |
|---|---|
| ***H01G 11/28*** | (2013.01) |
| ***H01G 11/50*** | (2013.01) |
| ***H01G 11/86*** | (2013.01) |
| ***H01M 4/02*** | (2006.01) |
| ***H01M 4/133*** | (2010.01) |
| ***H01M 4/587*** | (2010.01) |

(52) U.S. Cl.

CPC ..... *C08G 73/1053* (2013.01); *C08G 73/1071* (2013.01); *C08G 73/1078* (2013.01); *C08G 73/1085* (2013.01); *H01G 11/28* (2013.01); *H01G 11/50* (2013.01); *H01G 11/86* (2013.01); *H01M 4/133* (2013.01); *H01M 4/587* (2013.01); *H01M 2004/027* (2013.01)

(58) Field of Classification Search

CPC ............ C08G 73/1042; C08G 73/1053; C08G 73/1071; C08G 73/1078; C08G 73/1085; H01G 11/28; H01G 11/50; H01G 11/86

See application file for complete search history.

(56) References Cited

U.S. PATENT DOCUMENTS

| | | | | |
|---|---|---|---|---|
| 2016/0137787 | A1 | 5/2016 | Oka et al. | |
| 2018/0208766 | A1* | 7/2018 | Nakayama | C08G 73/105 |
| 2018/0226677 | A1* | 8/2018 | Nishiura | H01M 4/662 |
| 2019/0044149 | A1* | 2/2019 | Serizawa | H01M 10/052 |
| 2020/0020926 | A1 | 1/2020 | Ohsawa et al. | |
| 2020/0028175 | A1* | 1/2020 | Serizawa | H01M 4/0404 |
| 2020/0131314 | A1 | 4/2020 | Chayama et al. | |
| 2020/0224054 | A1* | 7/2020 | Nakayama | H01M 4/0404 |
| 2022/0162445 | A1* | 5/2022 | Goshima | C08G 73/1032 |

FOREIGN PATENT DOCUMENTS

| | | | |
|---|---|---|---|
| JP | A-2019-003873 | | 1/2019 |
| WO | WO 2013/035806 | A1 | 3/2013 |
| WO | WO 2014/208704 | A1 | 12/2014 |
| WO | WO 2017/022796 | A1 | 2/2017 |
| WO | WO 2017-138604 | A1 | 8/2017 |
| WO | WO 2018/174299 | A1 | 9/2018 |
| WO | WO 2020/157953 | A1 | 8/2020 |
| WO | WO 2021/053800 | A1 | 3/2021 |
| WO | WO 2021/153147 | A1 | 8/2021 |

OTHER PUBLICATIONS

Office Action in Korean Patent Application No. 10-2024-7027481 issued on Oct. 18, 2024 & English translation in 14 pages.

XP 93247898A, Jan. 2023, UBE Corporation: "UPIA" Retrieved from the Internet: URL:https://www.ube.com/ube/en/assets/images/contents/chemical/polyimide/upia_atst_e.pdf.

Extended Search Report issued in corresponding European Patent Application No. 23743270.3, dated Mar. 26, 2025, in 12 pages.

* cited by examiner

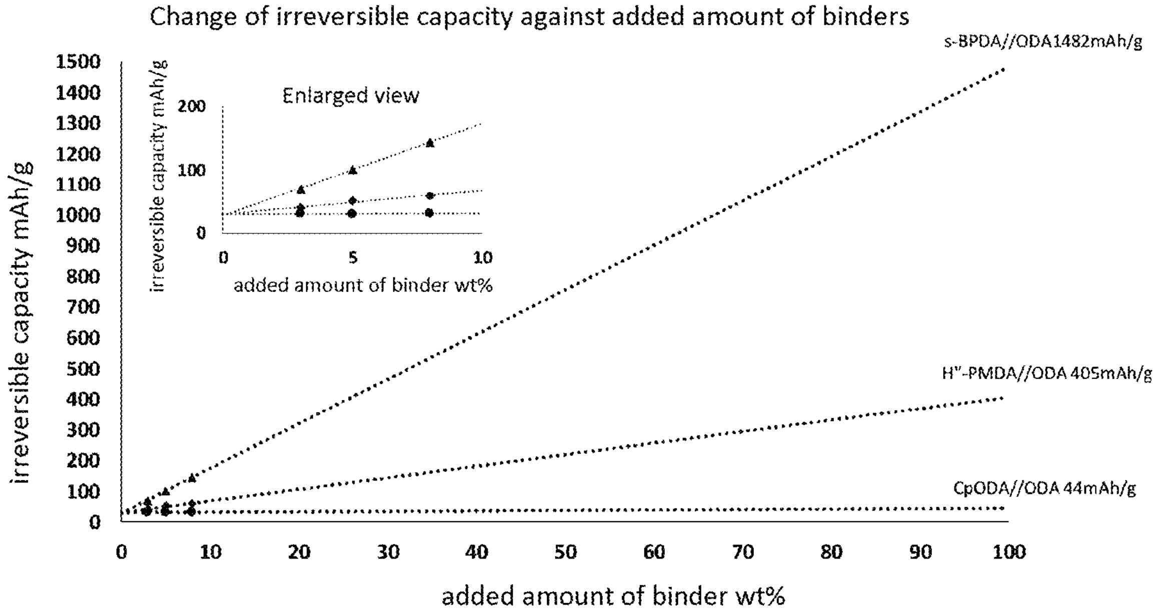
Change of irreversible capacity against added amount of binders
s-BPDA//ODA1482mAh/g
H"-PMDA//ODA 405mAh/g
CpODA//ODA 44mAh/g
irreversible capacity mAh/g
1500
1400
1300
1200
1100
1000
900
800
700
600
500
400
300
200
100
0
0
10
20
30
40
50
60
70
80
90
100
added amount of binder wt%
Enlarged view
irreversible capacity mAh/g
200
100
0
0
5
10
added amount of binder wt%

POLYIMIDE BINDER PRECURSOR COMPOSITION, AND POWER STORAGE DEVICE USING SAME

CROSS-REFERENCE TO RELATED APPLICATIONS

This application is the U.S. National Phase under 35 U.S.C. § 371 of International Application PCT/JP2023/001286, filed Jan. 18, 2023, designating the U.S., and published in Japanese as WO 2023/140276 on Jul. 27, 2023 which claims priority to Japanese Patent Application No. 2022-007980 filed Jan. 21, 2022; and to Japanese Patent Application No. 2022-105139 filed Jun. 29, 2022, the entire contents of which are incorporated herein by reference.

TECHNICAL FIELD

The present invention relates to a polyimide-based binder for power storage devices such as lithium ion secondary batteries, and more particularly to a polyimide binder precursor composition, an electrode mixture paste, a negative electrode active material layer, a negative electrode sheet, and a power storage device.

BACKGROUND ART

A power storage device such as a lithium secondary battery has a high energy density and a high capacity, and is therefore widely used as a drive power source for mobile information terminals. In recent years, application to industrial applications such as mounting on electric/hybrid automobiles, unmanned aerial vehicles, and the like, has been investigated, and further increase in capacity of a power storage device is being promoted. As an example of increasing a capacity, regarding a negative electrode constituting a power storage device, studies to increase the charge/discharge capacity have been conducted by employing silicon or tin or an alloy containing these having a large storing amount per unit volume.

However, it is known that an electrode active material having a large charge/discharge capacity such as silicon, tin, or an alloy containing these causes a very large volume change associated with charge/discharge. Therefore, when these electrode active materials are used to form a negative electrode active material layer using a general-purpose binder such as polyvinylidene fluoride or a rubber-based resin, problems such as disintegration of the negative electrode active material layer or interfacial peeling between a current collector and a negative electrode active material layer occur due to the volume change of the electrode active material, leading to the deterioration of the cycle characteristics of the power storage device.

To address these problems, the use of polyimide-based binders has been proposed as a method for improving the deterioration of cycle characteristics caused by volume changes during repeated charging and discharging (see, for example, Patent Documents 1 to 3).

On the other hand, Patent Document 4 (US 2006/0099506) points out that a large irreversible capacity is observed when a polyimide-based binder is used. Specifically. Patent Document 4 proposes a solution for reducing the irreversible capacity in a polyimide-based binder obtained from 3,3'4,4'-benzophenonetetracarboxylic dianhydride and 4,4'-oxydianiline by replacing a part or all of the tetracarboxylic acid dianhydride thereof with 1,2,3,4-butanetetracarboxylic dianhydride, which is an open-chain aliphatic tetracarboxylic acid dianhydride.

In addition, Patent Document 5 (JP 2019-3873 A) describes the use of a binder containing an imide group-containing polymer compound having a tensile modulus of elasticity of 3.0 GPa or more and a reactivity to lithium ions of 1200 mAh/g or less in a negative electrode active material layer containing a silicon-based negative electrode active material.

CITATION LIST

Patent Document

Patent Document 1: WO 2013/035806
Patent Document 2: WO 2017/022796
Patent Document 3: WO 2018/174299
Patent Document 4: US2006/0099506
Patent Document 5: Japanese Patent Laid-Open No. 2019-3873

SUMMARY OF THE INVENTION

Technical Problem

The inventors investigated and found that if the binder itself has an irreversible capacity. Li is taken also into the binder during the first charge, and Li still remains in the binder without released during discharge, and thus, Li is required more than the amount of the theoretical capacity of the negative electrode active material.

Therefore, the larger the irreversible capacity of the binder itself, the more Li must be loaded on the positive electrode, which may increase the weight of the entire battery. In order to eliminate these concerns, there is a need to develop a polyimide binder with a smaller irreversible capacity. As described above, Patent Document 4 aims to reduce irreversible capacity, but the degree of reduction is insufficient and compositional considerations are not made. Further, Patent Document 5 suggests that reactivity to lithium ions is related to cycle characteristics, but does not measure initial irreversible capacity. In order to correctly evaluate the influence on the initial efficiency, it is necessary to evaluate the charge/discharge capacity of the binder itself and estimate the irreversible capacity that is the difference between them. There is also almost no mention of the structure of polyimide, and thus it is impossible to understand the details.

In addition, in the case of a lithium ion capacitor, if the irreversible capacity of the binder is large, a large amount of lithium ions will be required for pre-doping, and it is assumed that the pre-doping processing time and the like will change significantly.

The present invention has been made to solve the above problems, and an object thereof is to provide a polyimide binder having a small irreversible capacity and a precursor composition thereof. In addition, by using the polyimide binder of the present invention, a power storage device such as a lithium ion secondary battery having a high initial charge/discharge efficiency can be provided.

Solution to Problem

The present invention relates to the following items.

1. A polyimide binder precursor composition for a power storage device electrode, comprising a reaction product of a tetracarboxylic acid component and a diamine component, and a solvent, wherein a polyimide binder obtained from the polyimide binder precursor composition has an irreversible capacity of 1200 mAh/g or less.

2. The polyimide binder precursor composition according to the above item 1, wherein the polyimide binder precursor composition comprises a reaction product of a tetracarboxylic acid component comprising 50 mol % or more of an alicyclic tetracarboxylic dianhydride and a diamine component, and a solvent.

3. The polyimide binder precursor composition according to the above item 1 or 2, wherein the diamine component comprises 50 mol % or more of an aromatic diamine compound.

4. A negative electrode mixture paste for an electrical storage device, comprising the polyimide binder precursor composition according to any one of the above items 1 to 3 and an active material comprising a silicon-containing material and/or a graphite.

5. A negative electrode for a power storage device comprising:

(a) an electrode active material layer comprising an active material comprising a silicon-containing material and/or a graphite, and a polyimide binder that is a heated product of a polyimide precursor in the polyimide binder precursor composition according to any one of the above items 1 to 3; the polyimide binder binding the active material; and (b) a current collector 6. A power storage device comprising the negative electrode for a power storage device according to the above item 5.

7. A method for producing a negative electrode for a power storage device comprising the steps of:

casting or applying the negative electrode mixture paste according to the above item 4 onto a current collector; and heating the applied layer of the negative electrode mixture paste to form a negative electrode active material layer.

8. A method for producing a power storage device, comprising the method for producing a negative electrode according to the above item 7 as one step.

Advantageous Effects of Invention

According to the present invention, provided is a polyimide binder having a small irreversible capacity and a precursor composition thereof. In addition, by using the polyimide binder of the present invention, a power storage device such as a lithium ion secondary battery having a high initial charge/discharge efficiency can be provided. When this polyimide binder is used, for example, as a negative electrode binder, the amount of active material on the positive electrode side that compensates for irreversible capacity can be reduced, and as a result, a power storage device having lightweight and high-capacity can be obtained.

BRIEF DESCRIPTION OF DRAWING

FIG. 1 is a diagram showing one embodiment of a method for calculating the irreversible capacity of a polyimide binder itself in the present invention.

DESCRIPTION OF EMBODIMENTS

The polyimide binder precursor composition of the present invention comprises a reaction product of a tetracarboxylic acid component and a diamine component, and a solvent. The reaction product of the tetracarboxylic acid component and the diamine component in the polyimide binder precursor composition is a polyimide precursor as described below. The polyimide binder precursor composition of the present invention can be converted into a polyimide binder that binds particles of an active material, for example, by heating the polyimide binder precursor composition of the present invention together with, for example, particles of an active material to remove the solvent, and then subjecting the polyimide binder precursor composition to an imidization reaction as necessary. Therefore, in the present invention, the "polyimide binder (of the present invention)" is a binder obtained from the polyimide binder precursor composition of the present invention, and is a substance that binds particles of an active material, for example, in an electrode.

The polyimide binder obtained from the polyimide binder precursor composition of the present invention has an irreversible capacity of 1200 mAh/g or less. The irreversible capacity is preferably 1100 mAh/g or less, more preferably 1000 mAh/g or less, even more preferably 900 mAh/g or less, and even more preferably 800 mAh/g or less.

The irreversible capacity of the polyimide binder can be determined as follows.

(1) A polyimide binder precursor composition and a negative electrode active material are mixed at different ratios to produce a plurality of evaluation mixture pastes. Using the evaluation mixture pastes, a plurality of evaluation negative electrodes having different polyimide binder content ratios are manufactured.

(2) Using, for example, a metallic lithium as a counter electrode, the initial charge capacity and initial discharge capacity of the evaluation negative electrode are measured, and the difference between the charge capacity (mAh/g) and discharge capacity (mAh/g) of the active material layer is defined as the irreversible capacity (mAh/g) of the evaluation negative electrode. Herein, the charge capacity and discharge capacity per unit mass are calculated based on the total mass of the active material and the binder.

(3) The irreversible capacity (mAh/g) of the evaluation negative electrode is plotted against the content (mass %) of the polyimide binder to prepare a calibration curve. The irreversible capacity of the evaluation negative electrode having a polyimide binder content of 100% is defined as the "irreversible capacity of the polyimide binder."

The negative electrode active material for producing the evaluation negative electrode does not need to be a silicon-based material, and it is preferable to use graphite, which has a smaller capacity than silicon-based materials. In addition, the counter electrode is preferably made of metallic lithium in order to eliminate the influence of the irreversible capacity of the counter electrode.

It is also preferable that the polyimide binder has excellent mechanical properties. A binder with excellent mechanical properties can withstand expansion and contraction during charging and discharging even when a material that undergoes a large volume change, such as a silicon-based material, is used as the electrode active material, and is therefore known to prevent the active material from falling off, leading to excellent cycle characteristics.

The mechanical properties of the polyimide binder can be measured using a polyimide film formed from the polyimide binder precursor composition.

A representative mechanical property is the elastic modulus, and is preferably 1.0 GPa or more, more preferably 2.0 GPa or more, and even more preferably 2.5 GPa or more. It is also preferable that the elongation ratio (elongation at break) is large, and specifically, it is preferably 30% or more, more preferably 40% or more, even more preferably 50% or more, even more preferably 60% or more, and even more preferably 70% or more. The break energy is preferably 40 $MJ/m^3$ or more, more preferably 50 $MJ/m^3$ or more, and even more preferably 60 $MJ/m^3$ or more.

In particular, it is preferred that the elastic modulus, elongation ratio (elongation at break), and energy at break all simultaneously satisfy the "preferred" ranges.

Next, the components and manufacturing method of the polyimide binder precursor composition will be explained.

<Reaction Product of Tetracarboxylic Acid Component and Diamine Component>

In the present specification, the tetracarboxylic acid component includes tetracarboxylic acid, tetracarboxylic acid dianhydride, and other tetracarboxylic acid derivatives such as tetracarboxylic acid silyl ester, tetracarboxylic acid ester and tetracarboxylic acid chloride, each of which is used as a raw material for producing a polyimide. Although not particularly limited, it is convenient to use tetracarboxylic acid dianhydride from the view point of production, and the following description will be generally made to examples using tetracarboxylic acid dianhydride as a tetracarboxylic acid component. Further, the diamine component is a diamine compound having two amino groups ($—NH_2$), which is used as a starting material for producing a polyimide.

Here, the reaction product of the tetracarboxylic acid component and the diamine component is usually called a polyimide precursor, and typically includes a polyamic acid (or a derivative thereof) whose repeating unit is represented by the following general formula (I), but may have a structure in which imidization has proceeded further. In the formula, $X_1$ is derived from the tetracarboxylic acid component, and $Y_1$ is derived from the diamine component.

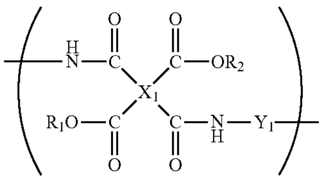
(I)

(wherein in general formula I. $X_1$ is a tetravalent aliphatic group or aromatic group, $Y_1$ is a divalent aliphatic group or aromatic group, $R_1$ and $R_2$ are each independently a hydrogen atom, an alkyl group having 1 to 6 carbon atoms or an alkylsilyl group having 3 to 9 carbon atoms.).

A repeating unit in which general formula (I) is further imidized is a structure in which one or two of the two amide bonds present in general formula (I) are converted to imide bonds, and are specifically represented by the following general formulas (Ib), (Ic) and (II):

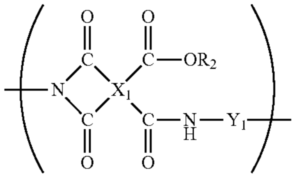
(Ib)

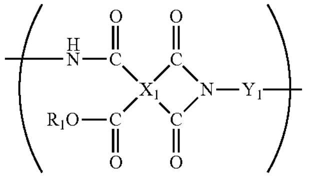
(Ic)

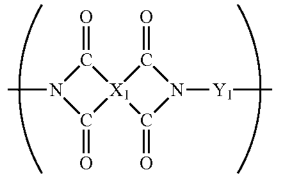
(II)

If every repeating unit in the polyimide precursor has general formula (I), the imidization ratio is 0%, and if every repeating unit has general formula (Ib) and/or (Ic), the imidization ratio is 50%, and if every repeating unit has general formula (II), the imidization ratio is 100% (that is, polyimide). The imidization ratio of the polyimide precursor may be in any range from 0 to 100%. In this application, even if the imidization ratio is 100%, those present in the polyimide binder precursor composition is referred to as a polyimide precursor.

In one preferred embodiment, the polyimide precursor comprises the repeating unit of formula (I), and for example, it may comprise repeating units selected from formulas (I), (Ib) and/or (Ic), and formula (II) so that the imidization ratio is 0 to 50%, for example 0 to 30%, or furthermore 0 to 20%. In another embodiment, the polyimide precursor comprises the repeating unit of formula (11), and for example, it may comprise repeating units selected from the above formulas so that the imidization ratio is more than 50% to 100%.

As the tetracarboxylic acid component, aliphatic tetracarboxylic dianhydrides or aromatic tetracarboxylic dianhydrides may be used. As the aliphatic tetracarboxylic dianhydride, an alicyclic tetracarboxylic dianhydride is preferable, and for example, a dianhydride of a tetracarboxylic acid in which four carboxyl groups are directly bonded to $X_1$ that is an alicyclic group is preferable. The use of an alicyclic tetracarboxylic dianhydride can achieve both high capacity of the power storage device by reducing the irreversible capacity of the polyimide binder and mechanical strength.

In a preferred embodiment of the present invention, the proportion of alicyclic tetracarboxylic dianhydrides in the total tetracarboxylic acid components is 50 mol % or more, more preferably 60 mol % or more, even more preferably 70 mol % or more, and even more preferably 80 mol % or more (including 100 mol %). The remaining tetracarboxylic acid components are preferably aromatic tetracarboxylic dianhydrides.

When the polyimide precursor is obtained using a tetracarboxylic acid component containing an alicyclic tetracarboxylic dianhydride and another tetracarboxylic dianhydride (preferably an aromatic tetracarboxylic dianhydride), the form thereof is not limited, and may be a copolymer, a block (co)polymer, a blend of homopolymers, or a blend of a copolymer and a homopolymer. A copolymer has, in one molecule, $X_1$ which is an alicyclic group and $X_1$ which is an aromatic group. A block (co)polymer is formed by reacting a block of repeating units having $X_1$ which is an alicyclic group and a block of repeating units having $X_1$ which is an aromatic group, forming one molecule. A homopolymer blend is a blend of a polymer having only $X_1$ which is an alicyclic group and a polymer having only $X_1$ which is an aromatic group.

To explain the alicyclic tetracarboxylic dianhydride, the alicyclic group $X_1$ is preferably a tetravalent group having an alicyclic structure having 4 to 40 carbon atoms, more preferably having at least one aliphatic 4- to 12-membered ring, more preferably an aliphatic 4-membered ring or an aliphatic 6-membered ring. Preferred examples of the tetravalent group having an aliphatic 4-membered ring or an aliphatic 6-membered ring include the following groups.

(10)

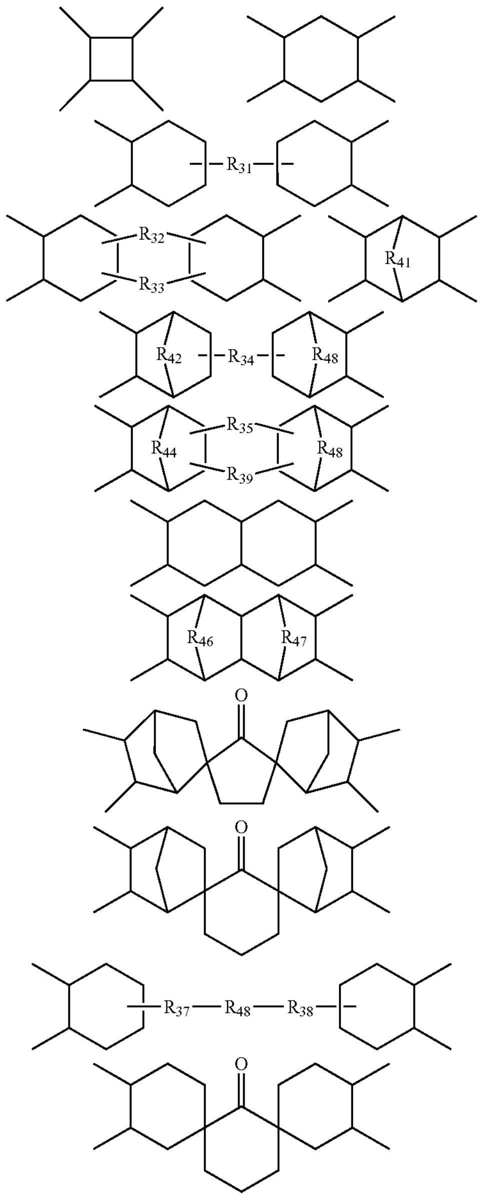

-continued

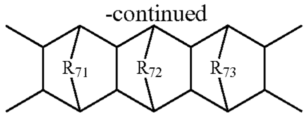

(wherein $R_{31}$ to $R_{38}$ are each independently a direct bond, or a divalent organic group, and $R_{41}$ to $R_{47}$ and $R_{71}$ to $R_{73}$ are each independently represent one selected from the group consisting of groups represented by the formulas: $—CH_2—$, $—CH═CH—$, $—CH_2CH_2—$, —O— and —S—. $R_{48}$ is an organic group having an aromatic ring or an alicyclic structure.)

Specific examples of $R_{31}$, $R_{32}$, $R_{33}$, $R_{34}$, $R_{35}$, $R_{36}$, $R_{37}$ and $R_{38}$ include a direct bond, an organic group having an aromatic ring or an alicyclic structure, an aliphatic hydrocarbon group having 1 to 6 carbon atoms, or an oxygen atom (—O—), a sulfur atom (—S—), a carbonyl bond, an ester bond, and an amide bond.

Examples of the organic group having an aromatic ring as $R_{31}$ to $R_{38}$ or $R_{48}$ include the following groups.

(4)

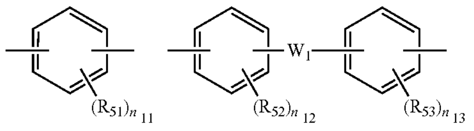

(wherein $W_1$ is a direct bond, or a divalent organic group; n11 to n13 each independently represent an integer of 0 to 4; and $R_{51}$, $R_{52}$ and $R_{53}$ are each independently an alkyl group having 1 to 6 carbon atoms, a halogen group, a hydroxyl group, a carboxyl group, or a trifluoromethyl group.)

Specific examples of $W_1$ include divalent groups represented by the formula (5) as described below, and divalent groups represented by the formula (6) as described below.

(5)

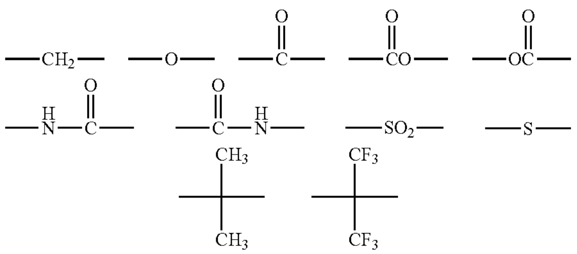

(6)

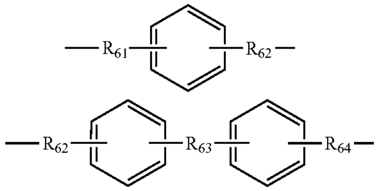

-continued

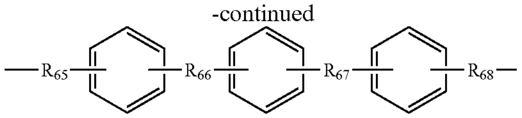

(wherein $R_{61}$ to $R_{68}$ in the formula (6) each independently represent any one of the divalent groups represented by the formula (5).)

Among them, the following group is particularly preferred as the tetravalent group having an alicyclic structure.

(11)

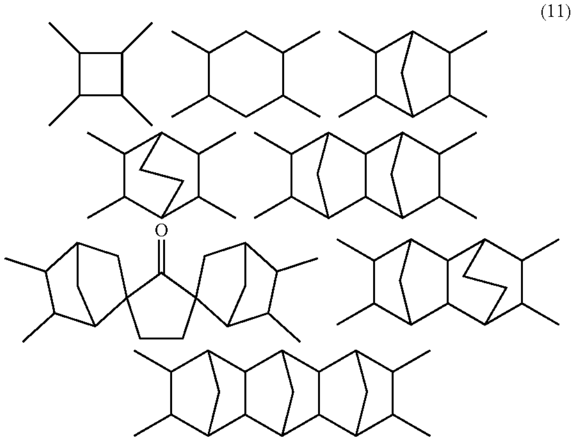

Examples of the tetracarboxylic acid dianhydride include monocyclic alicyclic tetracarboxylic dianhydrides such as 1,2,3,4-cyclobutane tetracarboxylic dianhydride and cyclohexane-1,2,4,5-tetracarboxylic dianhydride, and alicyclic tetracarboxylic dianhydrides having two or more rings such as [1,1'-bi(cyclohexane)]-3,3',4,4'-tetracarboxylic dianhydride, [1,1'-bi(cyclohexane)|-2,3,3',4'-tetracarboxylic dianhydride, 1,1'-bi(cyclohexane)]-2,2',3,3'-tetracarboxylic dianhydride, 4,4'-methylenebis(cyclohexane-1,2-dicarboxylic anhydride), 4,4'-(propane-2,2-diyl)bis(cyclohexane-1,2-dicarboxylic anhydride), 4,4'-oxybis(cyclohexane-1,2-dicarboxylic anhydride), 4,4'-thiobis(cyclohexane-1,2-dicarboxylic anhydride), 4,4'-sulfonylbis(cyclohexane-1,2-dicarboxylic anhydride), 4,4'-(dimethylsilanediyl)bis(cyclohexane-1,2-dicarboxylic anhydride), 4,4'-(tetrafluoropropane-2,2-diyl)bis(cyclohexane-1,2-dicarboxylic anhydride), octahydropentalene-1,3,4,6-tetracarboxylic dianhydride, bicyclo[2.2.1]heptane-2,3,5,6-tetracarboxylic dianhydride, 6-(carboxymethyl)bicyclo[2.2.1]heptane-2,3,5-tricarboxylic dianhydride, bicyclo[2.2.2]octane-2,3,5,6-tetracarboxylic dianhydride, bicyclo[2.2.2]oct-5-ene-2,3,7,8-tetracarboxylic dianhydride, tricyclo[4.2.2.02,5]decane-3,4,7,8-tetracarboxylic dianhydride, tricyclo[4.2.2.02,5]dec-7-ene-3,4,9,10-tetracarboxylic dianhydride, 9-oxatricyclo[4.2.1.02,5]nonane-3,4,7,8-tetracarboxylic dianhydride, norbornane-2-spiro-α-cyclopentanone-α'-spiro-2"-norbornane-5,5",6,6"-tetracarboxylic dianhydride, (4arH,8acH)-decahydro-1t,4t:5c,8c-dimethanonaphthalene-2c,3c,6c,7c-tetracarboxylic dianhydride, (4arH,8acH)-decahydro-1t,4t:5c,8c-dimethanonaphthalene-2t,3t,6c,7c-tetracarboxylic dianhydride, decahydro-1,4-ethano-5,8-methanonaphthalene-2,3,6,7-tetracarboxylic dianhydride, tetradecahydro-1,4:5,8:9,10-trimethanoanthracene-2,3,6,7-tetracarboxylic dianhydride; and the like. These may be used alone or in combination of a plurality of types.

The aromatic tetracarboxylic dianhydride preferably has 2 to 3 aromatic rings. Examples of the aromatic group $X_1$ include compounds having the following structure.

(2)

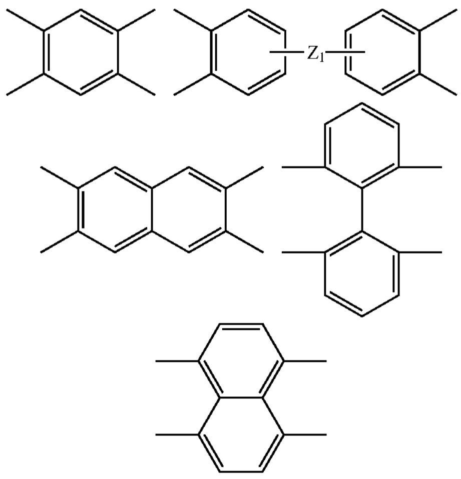

(wherein $Z_1$ is a direct bond, or any one of the following divalent groups:

(3)

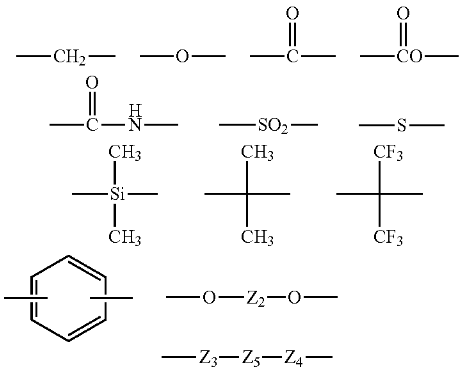

wherein $Z_2$ in the formula is a divalent organic group, $Z_3$ and $Z_4$ are each independently an amide bond, an ester bond and a carbonyl bond, and $Z_5$ is an organic group containing an aromatic ring.)

Specific examples of $Z_2$ include an aliphatic hydrocarbon group having 2 to 24 carbon atoms, and an aromatic hydrocarbon group having 6 to 24 carbon atoms.

Specific examples of $Z_5$ includes an aromatic hydrocarbon group having 6 to 24 carbon atoms.

Examples of the preferred aromatic tetracarboxylic dianhydride include, but not limited to, halogen-unsubstituted aromatic tetracarboxylic dianhydrides such as 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenonetetracarboxylic dianhydride, 4,4'-oxydiphthalic dianhydride, diphenylsulfonetetracarboxylic dianhydride, p-terphenyltetracarboxylic dianhydride, m-terphenyltetracarboxylic dianhydride; and halogen-substituted tetracarboxylic dianhydrides such as 4,4'-(hexafluoroisopropylidene)diphthalic anhydride, 3,3'-(hexafluoroisopropylidene)diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)pyropyridene]diphthalic anhydride, 1H-difuro[3,4-b:3',4'-i]xanthene-1,3,7,9(11H)-tetrone, 5,5'-oxybis[4,6,7-trifluoro-pyromellitic anhydride], 3,6-bis(trifluoromethyl)pyromellitic dianhydride, 4-(trifluoromethyl) pyromellitic dianhydride, 1,4-difluoropyromellitic dianhydride, 1,4-bis(3,4-dicarboxytrifluorophenoxy)tetrafluorobenzene dianhydride; and the like. These may be used alone or in combination of a plurality of types.

As the diamine component, an aromatic diamine compound or an aliphatic diamine compound is used. In a preferred embodiment of the present invention, the proportion of the aromatic diamine compound in the total diamine components is 50 mol % or more, more preferably 60 mol % or more, even more preferably 70 mol % or more, and even more preferably 80 mol % or more (including 100 mol %). The remaining diamine components are aliphatic diamine compounds, preferably diamine compounds having an alicyclic structure. In a different embodiment, the diamine component may comprise an aliphatic diamine compound, preferably an alicyclic diamine compound in a proportion of 50 mol % or more, more preferably 60 mol % or more, even more preferably 70 mol % or more, and even more preferably 80 mol % or more (including 100 mol %), based on the total diamine components.

To explain the aromatic diamine compound, examples of the aromatic group $Y_1$ include the following ones.

(4)

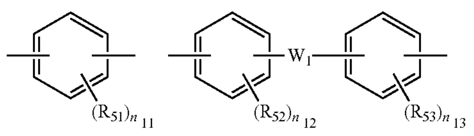

(wherein $W_1$ is a direct bond, or a divalent organic group; n11 to n13 each independently represent an integer of 0 to 4; and $R_{51}$, $R_{52}$ and $R_{53}$ are each independently an alkyl group having 1 to 6 carbon atoms, a halogen group, a hydroxyl group, a carboxyl group, or a trifluoromethyl group.)

Specific examples of $W_1$ include divalent groups represented by the formula (5) as described below, and divalent groups represented by the formula (6) as described below.

(5)

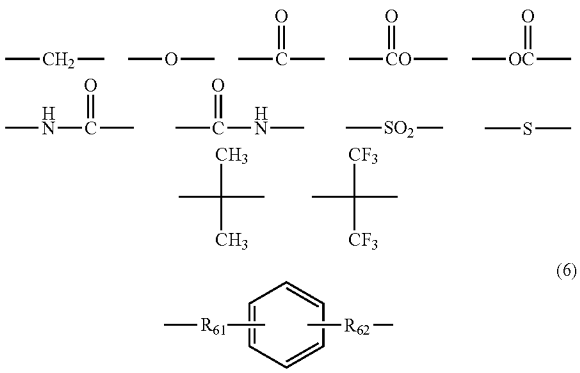

(6)

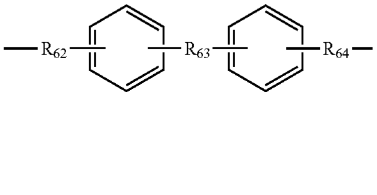

-continued

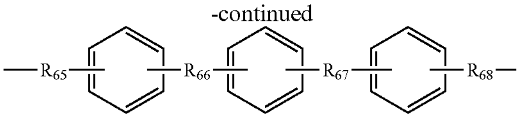

(wherein $R_{61}$ to $R_{68}$ in the formula (6) each independently represent any one of the divalent groups represented by the formula (5).)

Examples of the diamine component to provide a repeating unit of the general formula (I) in which $Y_1$ is a divalent group having an aromatic ring include p-phenylenediamine, m-phenylenediamine, 2,4-toluenediamine, 3,3'-dihydroxy-4,4'-diaminobiphenyl, bis(4-amino-3-carboxyphenyl)methane, benzidine, 3,3'-diamino-biphenyl, 2,2'-bis(trifluoromethyl)benzidine, 3,3'-bis(trifluoromethyl)benzidine, m-tolidine, 4,4'-diaminobenzanilide, 3,4'-diaminobenzanilide, N,N'-bis(4-aminophenyl)terephthalamide, N,N'-p-phenylenebis(p-amino benzamide), 4-aminophenoxy-4-diaminobenzoate, bis(4-aminophenyl) terephthalate, biphenyl-4,4'-dicarboxylic acid bis(4-aminophenyl)ester, p-phenylenebis(p-aminobenzoate), bis(4-aminophenyl)-[1,1'-biphenyl]-4,4'-dicarboxylate, [1,1'-biphenyl]-4,4'-diyl bis(4-aminobenzoate), 4,4'-oxydianiline (also known as 4,4'-diaminodiphenyl ether), 3,4'-oxydianiline, 3,3'-oxydianiline, p-methylenebis(phenylenediamine), 1,3-bis(4-aminophenoxy)benzene, 1,3-bis(3-aminophenoxy)benzene, 1,4-bis(4-aminophenoxy)benzene, 4,4'-bis(4-aminophenoxy)biphenyl, 4,4'-bis(3-amino phenoxy)biphenyl, 2,2-bis(4-(4-aminophenoxy)phenyl)hexafluoropropane, 2,2-bis(4-aminophenyl)propane, bis(4-aminophenyl)sulfone, 2,2-bis(4-aminophenyl)hexafluoropropane, bis(4-aminophenyl) sulfone, 3,3'-bis(trifluoromethyl)benzidine, 3,3'-bis((aminophenoxy)phenyl)propane, 2,2'-bis(3-amino-4-hydroxyphenyl)hexafluoropropane, bis(4-(4-aminophenoxy)diphenyl)sulfone, bis(4-(3-aminophenoxy)diphenyl)sulfone, octafluorobenzidine, 3,3'-dimethoxy-4,4'-diaminobiphenyl, 3,3'-dichloro-4,4'-diaminobiphenyl, 3,3'-difluoro-4,4'-diaminobiphenyl, 2,4-bis(4-aminoanilino)-6-amino-1,3,5-triazine, 2,4-bis(4-aminoanilino)-6-methylamino-1,3,5-triazine, 2,4-bis(4-aminoanilino)-6-ethylamino-1,3,5-triazine, and 2,4-bis(4-amino anilino)-6-anilino-1,3,5-triazine. Examples of the diamine component to provide a repeating unit of the general formula (I) in which $Y_1$ is a divalent group having a fluorine atom-containing aromatic ring include 2,2'-bis(trifluoromethyl) benzidine, 3,3'-bis(trifluoromethyl)benzidine, 2,2-bis[4-(4-aminophenoxy)phenyl]hexafluoropropane, 2,2-bis(4-aminophenyl) hexafluoropropane, and 2,2'-bis(3-amino-4-hydroxyphenyl)hexafluoropropane. In addition, preferred diamine compounds include 9,9-bis(4-aminophenyl)fluorene, 4,4'-(((9H-fluorene-9,9-diyl)bis([1,1'-biphenyl]-5,2-diyl))bis(oxy))diamine. [1,1'; 4', 1"-terphenyl]-4,4"-diamine, 4,4'-([1,1'-binaphthalene]-2,2'-diylbis(oxy))diamine. The diamine component may be used alone or in combination of a plurality of types.

To explain the diamine compound having an alicyclic structure, examples of the $Y_1$ which is a group having an alicyclic structure include the following ones.

(12)

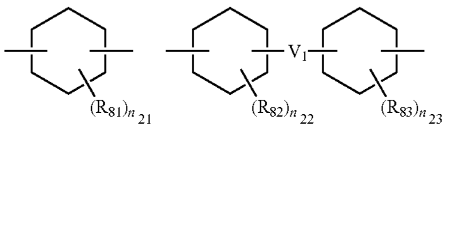

-continued

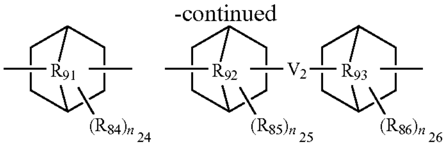

(wherein $V_1$ and $V_2$ are each independently a direct bond, or a divalent organic group: $n_{21}$ to $n_{26}$ each independently represent an integer of 0 to 4, $R_{81}$ to $R_{86}$ are each independently an alkyl group having 1 to 6 carbon atoms, a halogen group, a hydroxyl group, a carboxyl group, or a trifluoromethyl group; and $R_{91}$, $R_{92}$ and $R_{93}$ are each independently one selected from the group consisting of groups represented by the formulas: $—CH_2—$, $—CH{=}CH—$, $—CH_2CH_2—$, —O— and —S—)

Specific examples of $V_1$ and $V_2$ include a direct bond and divalent groups represented by the formula (5) as described above.

Examples of the diamine component to provide a repeating unit of the general formula (I) in which $Y_1$ is a divalent group having an alicyclic structure include 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino-2-n-butylcyclohexane, 1,4-diamino-2-isobutylcyclohexane, 1,4-diamino-2-sec-butylcyclohexane, 1,4-diamino-2-tert-butylcyclohexane, 1,2-diaminocyclohexane, 1,3-diamino cyclobutane, 1,4-bis(aminomethyl)cyclohexane, 1,3-bis (aminomethyl)cyclohexane, diaminobicycloheptane, diaminomethylbicycloheptane, diaminooxybicycloheptane, diaminomethyloxybicycloheptane, isophoronediamine, diaminotricyclodecane, diaminomethyltricyclodecane, bis (aminocyclohexyl)methane, bis(aminocyclohexyl)isopropylidene, 6,6'-bis(3-aminophenoxy)-3,3,3',3'-tetramethyl-1,1'-spirobiindane, and 6,6'-bis(4-aminophenoxy)-3,3,3',3'-tetramethyl-1,1'-spirobiindane. The diamine component may be used alone or in combination of a plurality of types.

[Solvent]

Preferred examples of solvents include nonpolar solvents (solvent with dielectric constant of 6 or less) including aromatic hydrocarbons such as xylene, toluene, and ethylbenzene, aliphatic hydrocarbons such as pentane, hexane, and heptane, and benzoic acid esters such as methyl benzoate, ethyl benzoate, and propyl benzoate; polar solvents (solvents with a dielectric constant of more than 6) including water, methanol, ethanol, acetone, N,N-dimethylformamide, dimethylamide, N,N-dimethylacetamide, N,N-diethylformamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxymethane, bis (2-methoxyethyl)ether, 1,2-bis(2-methoxyethoxy)ethane, tetrahydrofuran, bis[2-(2-methoxyethoxy)ethyl]ether, 1,4-dioxane, dimethylsulfoxide, dimethylsulfone, diphenyl ether, sulfolane, diphenylsulfone, tetramethylurea, anisole, m-cresol, phenol. γ-butyrolactone and the like; and mixtures of these solvents and the like. In particular, water, N-methyl-2-pyrrolidone, N-ethyl-2-pyrrolidone and γ-butyrolactone are preferred.

<Polyimide Binder Precursor Composition>

The polyimide binder precursor composition of the present invention is obtained by reacting a tetracarboxylic acid component and a diamine component in a reaction solvent. This reaction solvent may be any of the above-mentioned solvents, and preferably the reaction solvent is contained as it is in the polyimide binder precursor composition.

Using approximately equimolar amounts of a tetracarboxylic acid component (tetracarboxylic dianhydride) and a diamine component, this reaction is carried out at a relatively low temperature, for example, 25° C. or higher and 100° C. or lower, preferably 80° C. or lower. Although not limited thereto, the reaction temperature is usually 25° C. to 100° C. preferably 25° C. to 80° C., and more preferably 30° C. to 80° C. and the reaction time is, for example, about 0.1 to 72 hours, and preferably about 2 to 60 hours. The reaction can be carried out in an air atmosphere, but is usually suitably carried out in an inert gas atmosphere, preferably a nitrogen gas atmosphere.

Here, the approximately equimolar amount of the tetracarboxylic acid component (tetracarboxylic dianhydride) and the diamine component specifically means a molar ratio [tetracarboxylic acid component/diamine component] of about 0.90 to 1.10, preferably about 0.95 to 1.05.

The solid content concentration of the polyimide binder precursor composition (polyimide converted concentration of polyimide precursor) is preferably more than 5% by mass to 45% by mass, more preferably more than 10% by mass to 40% by mass, and even more preferably 10% by mass to 30% by mass. When the solid content concentration is lower than 5% by mass, the viscosity of the composition becomes too low, and when it is higher than 45% by mass, the fluidity of the composition may be lost. The reaction solution of the tetracarboxylic acid component and the diamine component may be used as it is as a polyimide binder precursor composition, or the concentration may be adjusted by concentrating or diluting it as necessary.

As to the solution viscosity (the viscosity of the polyimide binder precursor composition), the solution viscosity at 30° C. is preferably 1000 Pa·sec or less, more preferably 500 Pa·sec or less, further preferably 300 Pa·sec or less, and particularly preferably 200 Pa·sec or less. A solution viscosity of 1000 Pa·sec or less is preferable because if so, it facilitates mixing of the electrode active material powder and uniform application onto the current collector.

The polyimide binder precursor composition may contain additives other than the electrode active material, which will be described in the next section "Electrode mixture paste". Details will be described below using a lithium ion secondary battery as an example.

<Electrode Mixture Paste>

The electrode mixture paste, which is one of the embodiments of the present invention, is a composition comprising a polyimide binder precursor composition, an electrode active material, and an optionally added solvent.

As the electrode active material that can be used in the electrode mixture paste of the present invention, known materials can be preferably used. The polyimide binder precursor composition of the present invention can be used in either a negative electrode or a positive electrode. Therefore, the electrode active material may be either a negative electrode active material or a positive electrode active material. Generally, the negative electrode is more effective in using the polyimide binder precursor composition of the present invention. In this case, the electrode active material includes a negative electrode active material. As the electrode active material, for example, a lithium-containing metal composite oxide, a carbon powder, a silicon powder, a tin powder, or an alloy powder containing silicon or tin is preferable. The amount of the electrode active material in the electrode mixture paste is not particularly limited, and may be appropriately determined depending on the desired capacity. Usually, the amount of the electrode active material is preferably 0.1 times or more, more preferably 1 time or more, and even more preferably 5 times or more, and even more preferably 10 times or more, based on mass-basis amount of the solid content (polyimide converted mass) in the polyimide binder precursor composition. Within these ranges, the negative electrode active material layer contains more active portions therein, which enables it to function satisfactorily as an electrode. On the other hand, in order to sufficiently bind the electrode active material to the current collector and effectively prevent it from falling off, the amount of the electrode active material is preferably usually 1000 times or less relative to the solid content in the polyimide binder precursor composition.

As a negative electrode active material for a lithium secondary battery, a lithium metal, a lithium alloy, and a carbon material capable of absorbing and releasing lithium [easily graphitizable carbon, hardly graphitizable carbon having (002) plane spacing of 0.37 nm or more, graphite having (002) surface spacing of 0.34 nm or less, or the like], tin (elemental substance), tin compound, silicon (elemental substance), silicon compound, or lithium titanate compounds such as $Li_4Ti_5O_{12}$ or the like can be used alone or in combination of two or more types. In the present invention, it is preferable that the negative electrode active material comprises at least tin (elemental substance), tin compound, a silicon-containing material (in the following description, referred to as silicon-containing negative electrode active material or silicon-containing active material) such as silicon (elemental substance) or silicon compound. In particular, the silicon-containing material such as silicon (elemental substance) or a silicon compound has an extremely large theoretical capacity as compared with graphite, while the volume expansion ratio of the electrode active material itself during charging is also extremely large.

The lithium ion secondary battery using the polyimide binder precursor composition of the present invention suppresses deterioration of the electrode active material due to volume expansion, and is excellent in not only characteristics during use such as cycle characteristics but also characteristics over a wide temperature range such as low-temperature characteristics or gas generation after high-temperature storage.

The type of the silicon-containing active material is not particularly limited, and examples thereof include silicon (elemental substance), a silicon compound, a partial substitution product of silicon, a partial substitution product of a silicon compound, and a solid solution of a silicon compound. Specific suitable examples of the silicon compound include silicon oxides represented by formula: SiOx ($0.05<x<1.95$), silicon carbides represented by formula: SiCy ($0<y<1$), silicon nitrides represented by formula: SiNz ($0<z<4/3$), silicon alloys which are alloys of silicon and other different element(s) M, and the like. In the case of silicon alloys, preferred examples of other different element M1 include at least one element selected from the group consisting of Fe, Co, Sb, Bi, Pb, Ni, Cu, Zn, Ge. In, Sn and Ti.

The partial substitution product of silicon is a compound in which a part of silicon contained in silicon (elemental substance) and a silicon compound is replaced with other different element M2. Specific preferred examples of the other different element M2 include B, Mg, Ni, Ti, Mo, Co, Ca, Cr, Cu, Fe, Mn, Nb, Ta, V, W, Zn, C, N and Sn. Among these silicon-containing active materials, more preferred are silicon (elemental substance), silicon oxide, and silicon alloy, and further more preferred are silicon (elemental substance) and silicon oxide.

The amount of the silicon-containing active material is, as a mass of the net silicon in the negative electrode mixture, preferably 1% by mass or more, more preferably 5% by mass or more, still more preferably 10% by mass or more to obtain higher capacity, and preferably 95% by mass or less, more preferably 65% by mass or less, and further more preferably 45% by mass or less from the viewpoint of improving cycle characteristics.

Preferred solvents that can be used in the electrode mixture paste include nonpolar solvents, for example, aromatic hydrocarbons such as xylene, toluene and ethylbenzene, aliphatic hydrocarbons such as pentane, hexane and heptane, and benzoic acid esters such as methyl benzoate, ethyl benzoate and propyl benzoate; and water, methanol, ethanol, acetone, N, N-dimethylformamide, dimethylamide, N, N-dimethylacetamide, N, N-diethylformamide, N-methyl-2-pyrrolidone, N-ethyl-2-pyrrolidone, 1,3-dimethyl-2-imidazolidinone, N-methylcaprolactam, hexamethylphosphortriamide, 1,2-dimethoxymethane, bis(2-methoxyethyl) ether, 1,2-bis(2-methoxyethoxy)ethane, tetrahydrofuran, bis[2-(2-methoxyethoxy)ethyl]ether, 1,4-dioxane, dimethylsulfoxide, dimethylsulfone, diphenyl ether, sulfolane, diphenylsulfone, tetramethylurea, anisole, m-cresol, phenol, γ-butyrolactone; and in particular, water, N-methyl-2-pyrrolidone, N-ethyl-2-pyrrolidone, and γ-butyrolactone are preferable.

As the solvent, the solvent in the polyimide binder precursor composition may be used as it is, or if necessary, it may be concentrated or an additional solvent may be added to provide an appropriate concentration for coating.

In the electrode mixture paste of the present invention, when it is an aqueous solvent system, it is preferable to contain a pyridine compound or an imidazole compound. As a result, the degree of swelling of the obtained polyimide with respect to the electrolytic solution can be made smaller, and the elongation ratio (elongation at break) and break energy can be made larger. In addition, the heat treatment temperature for obtaining the negative electrode active material layer can be lowered. Pyridine compounds are compounds having a pyridine moiety in their chemical structure, and preferred examples thereof include pyridine, 3-pyridinol, quinoline, isoquinoline, quinoxaline, 6-tert-butylquinoline, acridine, 6-quinoline carboxylic acid, 3,4-lutidine, pyridazine, and the like. These pyridine compounds may be used alone or in combination of two or more. Examples of the imidazole compound include 1,2-dimethylimidazole, 2-ethyl-4-methylimidazole, 4-ethyl-2-methylimidazole, 1-methyl-4-ethylimidazole and the like. The imidazoles may be used alone of or in a mixture of plural kinds.

The amount of the pyridine compound to be added is not limited, but it is preferably 0.05 to 2.0 molar equivalents, more preferably 0.1 to 1.0 molar equivalent, with respect to 1 mol of repeating unit of the polyimide precursor (particularly polyamic acid). If the added amount is outside of this range, it may be difficult to use an aqueous solvent system. The amount of the imidazole compound to be added is not limited, but it is 1.6 molar equivalents or more, more preferably 2.0 molar equivalents or more, still more preferably 2.4 molar equivalents or more, with respect to 1 mol of amic acid repeating unit of the polyamic acid.

To the electrode mixture paste of the present invention, known additives may be added if necessary. For example, negative electrode conductive agent, base, surfactant, viscosity modifier, conductive assisting agent, silane coupling agent, binder other than a polyimide-based binder, and the like may be used as long as the effects of the present invention are not impaired.

The negative electrode conductive agent is not particularly limited as long as it is an electron conductive material that does not cause a chemical change, but it is preferable to use metal powders such as copper, nickel, titanium, or aluminum, carbon materials, or the like. Carbon materials used as conductive agents and negative electrode active materials preferably include graphites such as natural graphite (scaly graphite and the like), artificial graphite and other graphite; one or more of carbon blacks selected from acetylene black, ketjen black, channel black, furnace black, lamp black, and thermal black; and fibrous carbon powders such as carbon nanotubes and carbon fibers Further, it is more preferable that the negative electrode conductive agents may be appropriately mixed and used in such a mixture as graphite and carbon black, graphite and fibrous carbon powder, or carbon black and fibrous carbon powder. In particular, the use of fibrous carbon powder is preferable because it has an effect of reducing the use of a conductive agent having a large specific surface area in order to ensure conductivity. The carbon material is used as a conductive agent or a negative electrode active material, and the amount of the carbon material added to the negative electrode mixture is preferably 1 to 90% by mass, more preferably 10 to 70% by mass.

When a carbon material is used as a negative electrode conductive agent by mixing it with a silicon-containing negative electrode active material, the ratio of the silicon-containing negative electrode active material and the carbon material is such that the carbon material is preferably 10% by mass or more, more preferably 20% by mass or more, based on the total net mass of silicon in the silicon-containing negative electrode active material in the negative electrode mixture, from the viewpoint of improving a cycle characteristic due to the effect of enhancing electron conductivity by mixing with the carbon material. Further, if the ratio of the carbon material mixed with the silicon-containing negative electrode active material is too large, the amount of the silicon-containing negative electrode active material in the negative electrode mixture layer may decrease, and the effect of increasing the capacity may be reduced. The net mass of silicon in the silicon-containing negative electrode active material is preferably 1% by mass or more, more preferably 2% by mass or more, and further more preferably 5% by mass or more, based on the total mass of the carbon material. Further, it is more preferable that the conductive agent is composited by mixing it with a silicon-containing active material in advance and appropriately heat-treated if needed.

When graphite is used, more preferably used is a carbon material having a graphite-type crystal structure in which the plane spacing (d002) of the graphite lattice planes (002) is 0.340 nm (nanometers) or less, particularly 0.335 to 0.337 nm. In particular, preferred one is an artificial graphite particles having a massive structure in which a plurality of flat graphite fine particles are assembled or bonded in a non-parallel manner to each other, or spheroidized particles of scaly natural graphite obtained by applying repeatedly mechanical actions such as compressive force, frictional force, and shearing force.

The ratio I (110)/1 (004) is preferably 0.01 or more because the electrochemical characteristics in a wider temperature range are improved, and is more preferably 0.05 or more, and further more preferably 0.1 or more, wherein I (110)/1 (004) is a ratio of peak intensity I (110) of (110) plane and peak intensity I (004) of (004) plane of the graphite crystal determined from X-ray diffraction measurement measured for the negative electrode sheet obtained by press-forming the negative electrode into a density of 1.5 g/cm3 or more excluding the current collector. In addition, the upper limit of the peak intensity ratio I (110)/I (004) is preferably 0.5 or less and more preferably 0.3 or less, because excessive treatment may reduce the crystallinity and the discharge capacity of the battery.

Further, it is preferable that the highly crystalline carbon material (core material) is coated with a carbon material having a lower crystallinity than the core material because the electrochemical characteristics in a wide temperature range are further improved. The crystallinity of the coated carbon material can be confirmed by TEM. When a highly crystalline carbon material is used, it reacts with a non-aqueous electrolyte solution during charging and tends to deteriorate the characteristics of the lithium-ion secondary batteries in a wide temperature range such as low temperature characteristics after high temperature storage and gas generation due to the increase in interfacial resistance. However, if the polyimide binder precursor composition according to the present invention is used, the characteristics of these lithium-ion secondary batteries are improved.

As the negative electrode mixture paste, the polyimide binder precursor composition of the present invention is used. Other binders may be used together in an amount of 95% by mass or less, more preferably 45% by mass or less.

Examples of binders other than the polyimide binder precursor composition of the present invention include polyvinylidene fluoride, polytetrafluoroethylene, styrene butadiene rubber, butadiene rubber, nitrile rubber, polyacrylonitrile, ethylene vinyl alcohol copolymer resin, ethylene propylene diene rubber, polyurethane, polyacrylic acid, polyamide, polyacrylate, polyvinyl ether, fluororubber, carboxymethyl cellulose, and sodium carboxymethyl cellulose.

In addition, the electrode mixture paste of the present invention may further contain a solid electrolyte. Examples of the solid electrolyte include oxide-based solid electrolytes such as $La_{0.5}ILi_{0.34}TiO_{2.94}$ having perovskite type crystal, $Li_7La_3Zr_2O_{12}$ having garnet type crystal. $Li_{1.3}Al_{0.3}Ti_{1.7}(PO_4)_3$ having NASICON type crystal, and amorphous LIPON ($Li_{2.9}PO_{3.3}N_{0.46}$); and sulfide-based solid electrolytes such as $Li_2S$—$SiS_2$ based materials and $Li_2S$—$P_2S_5$ based materials.

The electrode mixture paste of the present invention can be produced as a uniform composition by applying the above-mentioned components to a known production method and by adding, stirring, mixing and the like. For example, an electrode mixture paste may be produced by producing a solution or dispersion in which a polyimide-based binder and a solvent are mixed, and then adding and mixing various additives.

<Negative Electrode Active Material Layer, Negative Electrode Sheet>

The negative electrode mixture paste of the present invention is cast or applied on a conductive current collector, and then heated to remove the solvent, and optionally subjected to an imidization reaction, to form a negative electrode (negative electrode sheet) having a negative electrode active material layer on the current collector. During the process of forming the negative electrode sheet, it is also preferable to press the negative electrode sheet using a roll press until the desired electrode density is achieved. Any known current collector can be used.

The polyimide precursor present in the polyimide binder precursor composition is converted to a polyimide binder by the heat treatment, and the particles of the active material and the conductive agent are bound to each other and to the current collector at the same time. The heat treatment removes the solvent, and allows the imidization of the polyimide precursor to proceed, which decreases the solubility in solvents such as the electrolyte solution and improves the solvent resistance. The heat treatment can be carried out at, for example, 80° C. to 450° C. To advance the imidization, it is preferable to perform heating so that the maximum temperature is preferably 180° C. to 450° C., more preferably 200° C. to 450° C., for example 250° C. to 380° C. or higher. In the temperature range of 200° C. or lower (or lower than 200° C.), particularly 180° C. or lower (or lower than 180° C.), the removal of the solvent mainly proceeds. Therefore, the heat treatment may be divided into a step of mainly removing the solvent and a step of mainly advancing the imidization, namely may be carried out stepwise or continuously by dividing step 1 of heating at 80° C. to 200° C. (or 180° C.), and step 2 of heating at a temperature of 200° C. or higher (or 180° C. or higher). In practice, imidization may proceed at high temperature range in step 1, and solvent removal may also occur in step 2 depending on the extent of solvent removal in step 1.

The times of steps 1 and 2 can be appropriately determined in consideration of the simplicity of the process, the desired imidization ratio, and the like. The time of step 1 may be 0 seconds (when step 1 is not performed), but is preferably 1 minute or more, more preferably 10 minutes or more, and preferably 5 hours or less, more preferably 2 hours or less, while the time of step 2 is preferably 10 minutes or more, more preferably 30 minutes or more, and preferably 24 hours or less, more preferably 12 hours or less.

When the imidization ratio of the polyimide precursor present in the polyimide binder precursor composition is high, for example, the imidization ratio is 70% or more, preferably 80% or more (it may be 90% or more or 100%), only the above-mentioned step 1, in which the solvent is mainly removed, may be sufficient as the heat treatment in some cases. However, in order to ensure solvent removal and/or increase the imidization ratio, the above step 2 may also be performed.

The thickness of the negative electrode active material layer of the present invention may be appropriately determined depending on the application and the desired capacity. Although not limited, it is preferably to be used in the range of 0.1 μm to 500 μm, for example. More preferably, it is 1 μm or more, even more preferably 10 μm or more, even more preferably 20 μm or more, and more preferably 300 μm or less, even more preferably 100 μm or less, and even more preferably 50 μm or less.

<Positive Electrode Active Material>

As a positive electrode active material for lithium secondary batteries, a composite metal oxide with lithium containing at least one selected from cobalt, manganese and nickel is used. These positive electrode active materials can be used alone or in combination of two or more.

Examples of such lithium composite metal oxides include one or more selected from $LiCoO_2$, $LiMn_2O_4$, $LiNiO_2$, $LiCo_{1-x}Ni_xO_2(0.01<x<1)$, $LiCo_{1/3}Ni_{1/3}Mn_{1/3}O_2$, $LiNi_{1/2}Mn_{3/2}O_4$, and $LiCo_{0.98}Mg_{0.02}O_2$. Further, these may be used in combination, for example, $LiCoO_2$ and $LiMn_2O_4$. $LiCoO_2$ and $LiNiO_2$, and $LiMn_2O_4$ and $LiNiO_2$.

In addition, a part of the lithium composite metal oxide may be replaced with another element in order to improve safety and cycle characteristics during overcharging or to enable the use at a charging potential of 4.3 V or higher. For example, a part of cobalt, manganese, and nickel may be replaced with at least one or more elements such as Sn, Mg, Fe, Ti, Al, Zr, Cr, V, Ga, Zn, Cu, Bi, Mo, and La. Or a part of 0 can be replaced with S or F, or a coating may be formed by a compound containing these other elements.

Among these, preferred are lithium composite metal oxides that are operable at a charging potential of the positive electrode of 4.3 V versus Li or higher in a fully charged state, such as $LiCoO_2$, $LiMn_2O_4$, and $LiNiO_2$. More preferred are lithium composite metal oxides that are operable at 4.4 V or higher, for example, different-element-substituted lithium cobalt oxides such as $LiCo_{1-x}M_xO_2$ (wherein, M is one or more elements selected from Sn, Mg, Fe, Ti, Al, Zr, Cr, V, Ga, Zn, and Cu, $0.001 \leq x \leq 0.05$), and lithium composite metal oxides in which the ratio of nickel atoms and manganese atoms to all metal elements other than lithium atoms is 50 atomic % or more and 100 atomic % or less such as $LiNi_{1/3}Mn_{1/3}Co_{1/3}O_2$, $LiNi_{0.5}Mn_{0.3}Co_{0.2}O_2$, $LiNi_{1/2}Mn_{3/2}O_4$, and a solid solution of $Li_2MnO_3$ and $LiMO_2$ (wherein, M is a transition metal such as Co, Ni, Mn, Fe and the like). When a lithium composite metal oxide that operates at a high charging voltage is used, the characteristics of the lithium ion secondary battery tend to deteriorate when used in a wide temperature range due to the reaction with the electrolytic solution during charging. However, if the polyimide binder precursor composition according to the present invention is used, deterioration of the characteristics of these lithium ion secondary battery can be suppressed.

Further, as the positive electrode active material, lithium-containing olivine-type phosphate salts can also be used. In particular, a lithium-containing olivine-type phosphate containing at least one selected from iron, cobalt, nickel and manganese is preferable. Specific preferred examples thereof include one or more selected from $LiFePO_4$, $LiCoPO_4$, $LiNiPO_4$, and $LiMnPO_4$.

Some of these lithium-containing olivine phosphates may be replaced with other elements, and a part of iron, cobalt, nickel and manganese may be replaced with one or more elements selected from Co. Mn, Ni, Mg, Al, B, Ti, V, Nb, Cu, Zn, Mo, Ca, Sr, W, Zr and the like, or a coating may be formed by a compound containing these other elements or carbon material. Among these, $LiFePO_4$ or $LiMnPO_4$ is preferred.

Further, the lithium-containing olivine-type phosphate can be used in a mixture with, for example, the above-mentioned positive electrode active material(s).

<Positive Electrode Conductive Agent>

The positive electrode conductive agent is not particularly limited as long as it is an electronic conductive material that does not cause a chemical change. Preferred examples thereof include graphites such as natural graphite (scaly graphite and the like), artificial graphite and other graphite; one or more of carbon blacks selected from acetylene black, ketjen black, channel black, furnace black, lamp black, and thermal black; and fibrous carbon powders such as carbon nanotubes and carbon fibers. Further, it is more preferable that the positive electrode conductive agents may be appropriately mixed and used in such a mixture as graphite and carbon black, graphite and fibrous carbon powder, or carbon black and fibrous carbon powder. The amount of the carbon material added to the positive electrode mixture is preferably 1 to 10% by mass, more preferably 2 to 5% by mass <Positive Electrode Binder>

As the positive electrode mixture paste, the polyimide binder precursor composition of the present invention can be used, but other binders may be also used, and the examples thereof include polytetrafluoroethylene (PTFE), polyvinylidene fluoride (PVDF), copolymer of styrene and butadiene (SBR), copolymers of acrylonitrile and butadiene (NBR), carboxymethyl cellulose (CMC), or ethylene propylene dien terpolymer.

Further, the polyimide binder precursor composition of the present invention and other binders can be used in combination, but the preferred embodiment thereof is the same as that described in the section of [Negative electrode binder].

<Positive Electrode Sheet>

The positive electrode sheet is a sheet formed by casting or applying the electrode mixture paste, which is a mixture of a positive electrode binder, a positive electrode active material, and an optional component such as a conductive agent, on a current collector to form an active material layer.

<Lithium Ion Secondary Battery>

The lithium ion secondary battery according to one embodiment of the present invention includes the above-mentioned negative electrode (negative electrode sheet), and known configurations may be employed for those required for lithium ion secondary batteries, such as a positive electrode (positive electrode sheet), an electrolytic solution, and other components as required, for example, a separator. The lithium ion secondary battery may be a lithium polymer battery using a gel electrolyte as the electrolyte, or an all-solid-state battery using an inorganic solid electrolyte such as an oxide or sulfide electrolyte.

<Other Power Storage Devices>

The polyimide binder of the present invention can be used not only for lithium ion secondary batteries but also for other power storage devices having a mechanism similar to lithium ion secondary batteries, such as lithium ion capacitors.

EXAMPLES

Hereinafter, the present invention will be explained in more detail with reference to Examples and Comparative Examples, but the present invention is not limited to these Examples.

The abbreviations of compounds used in the following examples will be explained.

<Tetracarboxylic Acid Component>

H"-PMDA: cyclohexane-1,2,4,5-tetracarboxylic dianhydride (chair isomer)

H'-PMDA: cyclohexane-1,2,4,5-tetracarboxylic dianhydride (boat isomer)

CBDA: 1,2,3,4-cyclobutanetetracarboxylic dianhydride

CpODA: norbornane-2-spiro-α-cyclopentanone-α'-spiro-2"-norbornane 5,5",6,6"-tetracarboxylic dianhydride DNDAxx: (4arH,8acH)-decahydro-1t,4t:5c.8c-dimethanonaphthalene-2t,3t,6c,7c-tetracarboxylic dianhydride BTA: Bicyclo[2.2.2]oct-7-ene-2,3,5,6-tetracarboxylic dianhydride H-sBPDA: [1,1'-bi(cy clohexane)]-3,3',4,4'-tetracarboxylic dianhydride PPHT: (Octahydro-1,3-dioxo-5-isobenzofurancarboxylic acid) 1,4-phenylenediamide PMDA: Pyromellitic dianhydride s-BPDA: 3,3',4,4'-biphenyltetracarboxylic dianhydride

[Diamine Component]

ODA: 4,4'-diaminodiphenyl ether

PPD: p-phenylenediamine

TPE-R: 1,3-bis(4-aminophenoxy)benzene

BAPP: 2,2-bis[4-(4-aminophenoxy)phenyl]propane

MBAA: bis(4-amino-3-carboxyphenyl)methane

DABAN: 4,4'-diaminobenzanilide

DATP: 4,4"-diamino-p-terphenyl

<Others>

EC: ethylene carbonate

DEC: diethyl carbonate

VC: vinylene carbonate

NMP: N-methyl-2-pyrrolidone

TABLE 1

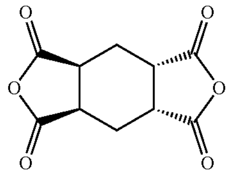 [SMILES: O=C1OC(=O)[C@@H]2C[C@H]3C(=O)OC(=O)[C@H]3C[C@H]12]

H" PMDA

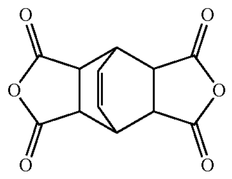 [SMILES: O=C1OC(=O)C2C3C=CC(C12)C1C(=O)OC(=O)C31]

BTA

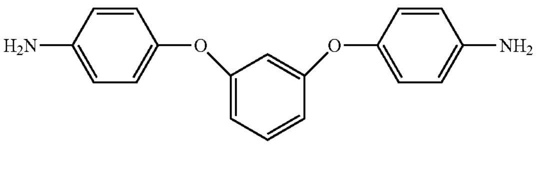 [SMILES: Nc1ccc(Oc2cccc(Oc3ccc(N)cc3)c2)cc1]

TPE-R

TABLE 1-continued
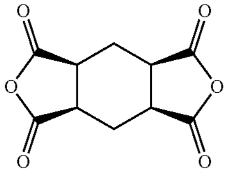 [SMILES: O=C1OC(=O)[C@@H]2C[C@@H]3C(=O)OC(=O)[C@@H]3C[C@H]12]
H'-PMDA
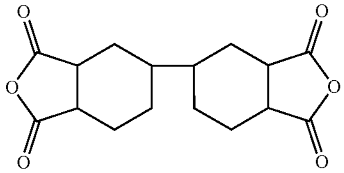 [SMILES: O=C1OC(=O)C2CC(C3CCC4C(=O)OC(=O)C4C3)CCC12]
H-sBPDA
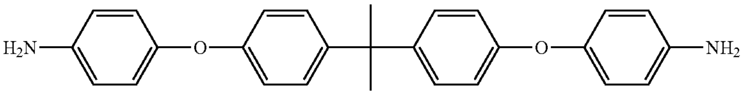 [SMILES: CC(C)(c1ccc(Oc2ccc(N)cc2)cc1)c1ccc(Oc2ccc(N)cc2)cc1]
BAPP
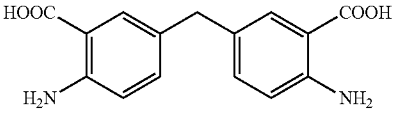 [SMILES: Nc1ccc(Cc2ccc(N)c(C(=O)O)c2)cc1C(=O)O]
MBAA
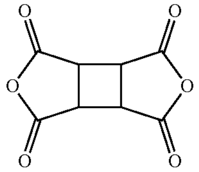 [SMILES: O=C1OC(=O)C2C1C1C(=O)OC(=O)C21]
CBDA
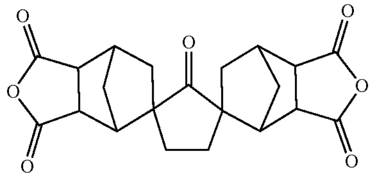 [SMILES: O=C1OC(=O)C2C1C1CC2C2(CCC3(CC4CC3C3C(=O)OC(=O)C43)C2=O)C1]
CpODA
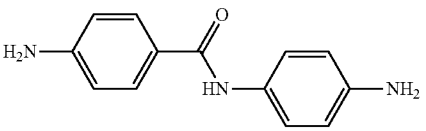 [SMILES: Nc1ccc(NC(=O)c2ccc(N)cc2)cc1]
DABAN
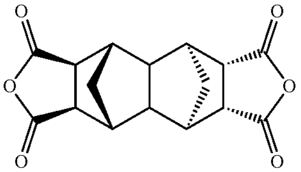 [SMILES: O=C1OC(=O)[C@H]2[C@@H]1[C@H]1C[C@@H]2C2C1[C@@H]1C[C@H]2[C@H]2C(=O)OC(=O)[C@H]21]
DNDAxx TABLE 1-continued

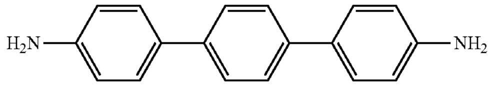 [SMILES: Nc1ccc(-c2ccc(-c3ccc(N)cc3)cc2)cc1]

DATP

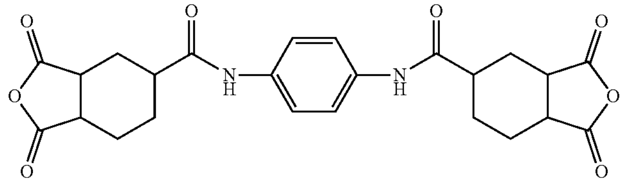 [SMILES: O=C(Nc1ccc(NC(=O)C2CCC3C(=O)OC(=O)C3C2)cc1)C1CCC2C(=O)OC(=O)C2C1]

PPHT

PPD

<Calculation of Irreversible Capacity of Polyimide Binder>

(A1) Preparation of Negative Electrode for Evaluation

A graphite (MAG-D; massive artificial graphite, manufactured by Showa Denko Materials Co., Ltd., average particle size 20 μm) as a negative electrode active material and a polyimide binder precursor composition (Examples and Comparative Examples) were blended so as to have a solid content ratios of 92:8, 95:5, and 97:3 (mass %), and then NMP was added and mixed so that a slurry concentration becomes about 50 mass %, whereby negative electrode mixture pastes were prepared.

The negative electrode mixture paste was applied onto a nickel-plated steel foil (thickness 10 μm) as a current collector and pre-dried for 3 minutes on a hot plate at 110° C. Then, it was roll-pressed and placed in an electric furnace and heat-treated at 360° C. for 1.5 hours under argon flow to prepare a negative electrode for evaluation (2 $mAh/cm^2$).

(A2) Preparation of Battery for Evaluation

Using the negative electrode for evaluation obtained in (1) above, a battery for evaluation was fabricated in the following configuration.

Cell shape: 2032 type coin cell

Counter electrode: Lithium foil (metallic lithium)

Electrolyte: IM $LiPF_6$/EC:DEC=1:1 (volume %) VC 1% by mass was added

Separator (A3) Battery Evaluation

Charging and discharging were carried out under the following conditions.

Measurement temperature: 30° C.

Charge/discharge range: 0.001 to 2.0 V (However, the initial charging should be performed from the natural potential (approximately 3V) to 0.001V.)

Charge/discharge current value; 0.02C

The charge capacity and discharge capacity (mAh/g) are calculated based on the weight of the entire active material layer (the sum of the weight of the active material and the weight of the binder). The difference between the first charge capacity and the first discharge capacity up to 1 V was calculated as the irreversible capacity. Herein, the absorption of Li in the "evaluation negative electrode" is referred to as "charging", and the release of Li from the "evaluation negative electrode" is referred to as discharge.

(A4) Calculation of Irreversible Capacity of Polyimide Binder Itself

As shown in FIG. 1, the irreversible capacity of the battery calculated in (A3) above was plotted against the amount of polyimide binder added (mass %) to create a calibration curve. In the obtained calibration curve, the irreversible capacity at a binder addition amount of 100% is defined as the irreversible capacity of the polyimide itself.

<Evaluation of Elemental Silicon Negative Electrode Using Polyimide Binder>

(B1) Preparation of Elemental Silicon Negative Electrode

As a negative electrode active material, silicon (manufactured by Elkem, average particle diameter 3 μm), polyimide binder precursor composition (examples and comparative examples), and conductive assisting agent (acetylene black, manufactured by DENKA) were mixed in a solid content ratio of 60:30:10 (% by mass) to prepare a negative electrode mixture paste. The negative electrode mixture paste was applied onto a nickel-plated steel foil (thickness: 10 μm) serving as a current collector, and pre-dried at 110° C. for 3 minutes. Thereafter, it was roll pressed, placed in an electric furnace, and heat treated at 360° C. for 1.5 hours under an argon flow, whereby a negative electrode (3 $mAh/cm^2$) was prepared.

(B2) Battery Evaluation Using Elemental Silicon Negative Electrode

A battery was prepared in the same manner as in (A2) above, and charge and discharge were carried out under the following conditions.

Measurement temperature: 30° C.

Charge/discharge range: 0.001 to 1.0 V (However, the initial charging should be done from the natural potential (approximately 3V) to 0.001V.)

Charge/discharge current value: 0.1 C (B3) Initial Charge/Discharge Efficiency

The initial charge/discharge efficiency was calculated by the following formula.

Initial charge/discharge efficiency=(first discharge capacity up to 1V)/(first charge capacity)×100%

<Evaluation of Mechanical Properties of Polyimide Binder>

The polyimide binder precursor composition (Examples and Comparative Examples) was applied onto a glass substrate using a spin coater, dried at 80° C. for 10 minutes, and then heat-treated in a nitrogen atmosphere at 120° C. for 30 minutes, at 150° C. for 10 minutes, at 200° C. for 10 minutes, at 250° C. for 10 minutes, and at 350° C. for 10 minutes (heating rate; 5° C./min) to obtain a film having a thickness of 10 μm. The obtained film was cut into a strip having a width of 10 mm and a length of 200 mm to prepare a test sample.

The test sample was set in a tensile tester with a chuck distance set to 100 mm, and the sample was pulled at a speed of 50 mm/min. The elastic modulus, elongation ratio (elongation at break), and break energy were calculated from the obtained stress-strain curve. The measurement environment was room temperature in the atmosphere.

Production Examples and Comparative Examples of Polyimide Binder Precursor Composition

[Composition PI-1]

160 g of NMP was added to a reaction vessel, and the inside of the vessel was replaced with nitrogen and kept at 50° C. Into the vessel, 23.5916 g of ODA was added and dissolved, and then a total of 26.3424 g of H"-PMDA (molar ratio to diamine is 1) was added stepwise together with 40 g of NMP, and the mixture was stirred overnight at 50° C. to obtain a polyimide binder precursor composition PI-1. Viscosity 49P

[Compositions PI-2 to PI-12]

Using the tetracarboxylic dianhydride and diamine shown in Table 2, polyimide binder precursor compositions PI-2 to PI-12 were obtained by reacting them in the same manner as composition PI-1. The viscosity and concentration are shown in Table 2.

[Composition PI-10'] (Polyimide Solution Type Composition)

A polyimide solution-type polyimide binder precursor composition was produced from the same monomer composition as composition PI-10 by advancing imidization. First, 160 g of NMP was added into a reaction vessel, and the inside of the vessel was purged with nitrogen and kept at 50° C. 32.3399 g of BAPP was supplied thereto and dissolved, and then temperature of the reaction bath was raised to 70° C. Into the vessel, a total of 17.6601 g of H"-PMDA (molar ratio to diamine is 1) was added stepwise together with 40 g of NMP. After stirring at 70° C. for 30 minutes, the mixture was stirred at 170° C. for 3 hours for imidization to obtain a polyimide binder precursor composition PI-10'. The viscosity and concentration are shown in Table 2.

[Compositions PI-13 to PI-14] (Copolymerized Polyimide Precursors)

Using the two types of tetracarboxylic dianhydrides shown in Table 2 as the tetracarboxylic acid components and the diamines shown in Table 2, polyimide binder precursor compositions PI-13 and PI-14 were obtained by reacting them in the same manner as in composition PI-1. The viscosities and concentrations are shown in Table 2. For compositions using two or more compounds as the tetracarboxylic acid components and diamine components, the molar ratios are shown in parentheses after the monomers.

[Compositions PI-15 to PI-18]

Using the tetracarboxylic dianhydride and diamine shown in Table 2, polyimide binder precursor compositions PI-15 to PI-18 were obtained by reacting them in the same manner as composition PI-1.

[Compositions PI-MIX] (Blend of Polyimide Precursors)

As shown in Table 2, two types of polyimide binder precursor compositions were blended to obtain a polyimide binder precursor composition PI-MIX. The viscosity and concentration are shown in Table 2. In Table 2, the mixing ratio is shown in parentheses as a molar ratio (ratio of the total number of monomer units).

[Compositions PI-19 to PI-23]

Using the tetracarboxylic dianhydride and diamine shown in Table 2, polyimide binder precursor compositions PI-19 to PI-23 were obtained by reacting them in the same manner as composition PI-1. The viscosity and concentration are shown in Table 2.

TABLE 2

| | tetracarboxylic dianhydride/diamine | tetracarboxylic acid component/ diamine ratio | viscosity | concentration at polymerization wt % |
|---|---|---|---|---|
| PI-1 | H"-PMDA/ODA | 1 | 49 P | 20 |
| PI-2 | H'-PMDA/ODA | 1 | 2 P | 20 |
| PI-3 | CBDA/ODA | 1 | 6 P | 20 |
| PI-4 | CpODA/ODA | 0.99 | 75 P | 20 |
| PI-5 | DNDAxx/ODA | 0.99 | 80 P | 20 |
| PI-6 | BTA/ODA | 1 | 0.1 P | 10 |
| PI-7 | H-sBPDA/ODA | 1 | 52 P | 12 |
| PI-8 | PPHT/ODA | 1 | 6 P | 20 |
| PI-9 | H"-PMDA/TPE-R | 1 | 66 P | 20 |
| PI-10 | H"-PMDA/BAPP | 1 | 62 P | 20 |
| PI-10' | H"-PMDA/BAPP (PI solution) | 1 | 2 P | 20 |
| PI-11 | H"-PMDA/MBAA | 1 | 1 P | 20 |
| PI-12 | H"-PMDA/DABAN | 0.99 | 69 P | 20 |
| PI-13 | H"-PMDA(8)/s-BPDA(2)//ODA | 1 | 75 P | 20 |
| PI-14 | H"-PMDA(2)/s-BPDA(8)//ODA | 1 | 110 P | 20 |
| PI-19 | H"-PMDA//ODA(2)/DABAN(8) | 1 | 18 P | 18 |
| PI-20 | H"-PMDA//ODA(8)/DABAN(2) | 0.99 | 7 P | 18 |
| PI-21 | CBDA//TPE-R(3)/ODA(7) | 0.99 | 26 P | 14 |
| PI-22 | CBDA//TPE-R(5)/PPD(5) | 0.99 | 43 P | 14 |
| PI-23 | CBDA//BAPP | 1 | 50 P | 17 |
| PI-15 | s-BPDA/ODA | 1 | 51 P | 20 |
| PI-16 | s-BPDA(5)/ODPA(5)//ODA(7)/PPD(3) | 1 | 55 P | 33 |
| PI-17 | PMDA/ODA | 0.99 | 48 P | 14 |
| PI-18 | s-BPDA/DATP | 0.98 | 20 P | 14 |
| PI-MIX | PI-1(7) + PI-15 (3) blend | 1 | 50 P | 20 |

<Results of Polyimide Binder Evaluation>

Using the produced polyimide binder precursor composition, a battery for evaluation was fabricated according to <Calculation of irreversible capacity of polyimide binder>, and the battery was evaluated to prepare a calibration curve and calculate the irreversible capacity of the polyimide binder. The results are shown in Table 3.

<Evaluation of Elemental Silicon Negative Electrode Using Polyimide Binder>

Using the produced polyimide binder precursor composition, a negative electrode using silicon as the negative electrode active material was prepared according to <Evaluation of elemental silicon negative electrode using polyimide binder>. Then a battery was prepared, and the initial charge/discharge efficiency was evaluated. The results are shown in Table 3.

TABLE 3

| Example | binder precursor composition | monomer composition | irreversible capacity of binder mAh/g | evaluation of Si negative electrode cell initial charge/discharge efficiency % |
|---|---|---|---|---|
| Example 1 | PI-1 | H"-PMDA//ODA | 405 | 86.5 |
| Example 2 | PI-2 | H'-PMDA//ODA | 188 | — |
| Example 3 | PI-3 | CBDA//ODA | 509 | 85.5 |
| Example 4 | PI-4 | CpODA//ODA | 44 | — |
| Example 5 | PI-5 | DNDAxx//ODA | 108 | — |
| Example 6 | PI-6 | BTA//ODA | 110 | — |
| Example 7 | PI-7 | H-sBPDA//ODA | 97 | — |
| Example 8 | PI-8 | PPHT//ODA | 211 | 80.7 |
| Example 9 | PI-9 | H"-PMDA//TPE-R | 667 | 81.5 |
| Example 10 | PI-10 | H"-PMDA//BAPP | 31 | — |
| Example 11 | PI-10' | H"-PMDA//BAPP (PI solution) | 8 | — |
| Example 12 | PI-11 | H"-PMDA//MBAA | 1063 | — |
| Example 13 | PI-12 | H"-PMDA//DABAN | 756 | 84.1 |
| Example 14 | PI-13 | H"-PMDA(8)/s-BPDA(2)//ODA | 1108 | 82.1 |
| Example 15 | PI-MIX | PI-1(7) + PI-15(3) blend | 1090 | 81.6 |
| Example 16 | PI-19 | H"-PMDA//ODA(2)/DABAN(8) | 828 | 84.1 |
| Example 17 | PI-20 | H"-PMDA//ODA(8)/DABAN(2) | 911 | 87.0 |
| Example 18 | PI-21 | CBDA//TPE-R(3)/ODA(7) | 557 | — |
| Example 19 | PI-22 | CBDA//TPE-R(5)/PPD(5) | 581 | 85.1 |
| Example 20 | PI-23 | CBDA//BAPP | 105 | — |
| Comp-Ex. 1 | PI-14 | H"-PMDA(2)/s-BPDA(8)//ODA | 1373 | 77.4 |
| Comp-Ex. 2 | PI-15 | s-BPDA//ODA | 1482 | 78.2 |
| Comp-Ex. 3 | PI-16 | s-BPDA(5)/ODPA(5)//ODA(7)/PPD(3) | 1488 | 78.2 |
| Comp-Ex. 4 | PI-17 | PMDA/ODA | 1483 | — |
| Comp-Ex. 5 | PI-18 | s-BPDA/DATP | 1431 | — |

From Table 3, it was found that when the irreversible capacity of the polyimide binder was 1200 mAh/g or less, the initial charge/discharge efficiency of the battery using elemental silicon as the negative electrode active material was 80% or more. Therefore, the use of the polyimide binder precursor composition of the present invention enables to increase the capacity of a lithium ion secondary battery.

<Evaluation Results of Mechanical Properties of Polyimide Binder>

Using the produced polyimide binder precursor composition, the mechanical properties (elastic modulus, elongation ratio (elongation at break), and break energy) of the binder were measured according to <Evaluation of Mechanical Properties of Polyimide Binder>. The results are shown in Table 4. The results show that the polyimide binder obtained from the polyimide binder precursor composition of the present invention has excellent mechanical properties and can fully function as a binder.

TABLE 4

| Example | binder precursor composition | monomer composition | elastic modulus Gpa | elongation ratio (elongation at break) % | break energy MJ/m3 |
|---|---|---|---|---|---|
| Example 1 | PI-1 | H"-PMDA//ODA | 3 | 119 | 134 |
| Example 3 | PI-3 | CBDA//ODA | 3.4 | 50 | 65 |
| Example 8 | PI-8 | PPHT//ODA | 1.3 | 100 | 76 |
| Example 9 | PI-9 | H"-PMDA//TPE-R | 2.5 | 167 | 162 |
| Example 10 | PI-10 | H"-PMDA//BAPP | 2.2 | 155 | 163 |

TABLE 4-continued

| Example | binder precursor composition | monomer composition | elastic modulus Gpa | elongation ratio (elongation at break) % | break energy MJ/m3 |
|---|---|---|---|---|---|
| Example 11 | PI-10' | H"-PMDA//BAPP (PI solution) | 2.2 | 155 | 163 |
| Example 13 | PI-12 | H"-PMDA//DABAN | 4.4 | 38 | 56 |
| Example 14 | PI-13 | H"-PMDA(8)/s-BPDA(2)//ODA | 2.4 | 107 | 124 |
| Example 16 | PI-19 | H"-PMDA//ODA(2)/DABAN(8) | 3.8 | 49 | 68 |
| Example 17 | PI-20 | H"-PMDA//ODA(8)/DABAN(2) | 2.9 | 87 | 112 |
| Example 18 | PI-21 | CBDA//TPE-R(3)/ODA(7) | 3.8 | 65 | 93 |
| Example 19 | PI-22 | CBDA//TPE-R(5)/PPD(5) | 4.6 | 95 | 136 |
| Example 20 | PI-23 | CBDA//BAPP | 2.5 | 131 | 129 |

INDUSTRIAL APPLICABILITY

The present invention can be suitably utilized as an electrode binder of electrical storage devices, such as a lithium ion secondary battery.

What is claimed is:

1. A polyimide binder precursor composition for a power storage device electrode, comprising a reaction product of a tetracarboxylic acid component and a diamine component, and a solvent, wherein a polyimide binder obtained from the polyimide binder precursor composition has an irreversible capacity of 1200 mAh/g or less, wherein the tetracarboxylic acid component comprises more than 80 mol % of an alicyclic tetracarboxylic dianhydride based on the total amount of the tetracarboxylic acid component, wherein the alicyclic tetracarboxylic dianhydride is selected from the group consisting of:

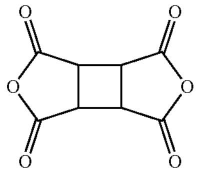

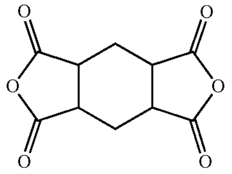

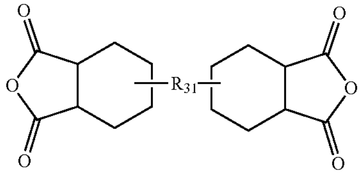

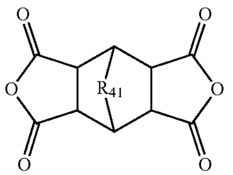

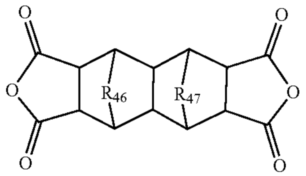

-continued

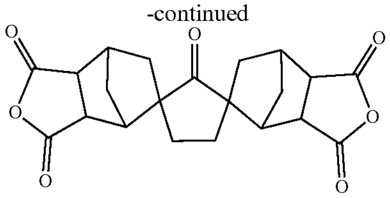

wherein $R_{31}$ is a direct bond or a divalent organic group, and $R_{41}$, $R_{46}$ and $R_{47}$ are each independently selected from the group consisting of $-CH_2-$, $-CH{=}CH-$, $-CH_2CH_2-$, $-O-$ and $-S-$; and the diamine component comprises, based on the total amount of the diamine component, more than 80 mol % of an aromatic diamine compound, wherein the aromatic diamine compound is selected from compounds represented by formula:

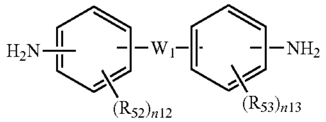

wherein $W_1$ is a divalent group selected from the group consisting of:

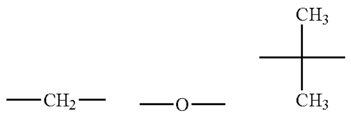

and a divalent group selected from formula (6):

(6)

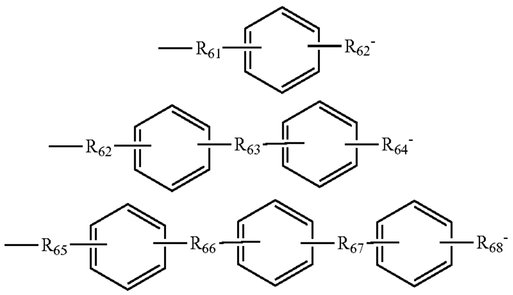

wherein $R_{61}$ to $R_{68}$ each independently represents any one of the divalent groups selected from the group consisting of:

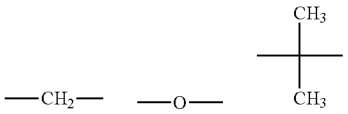

n12 and n13 each independently represent an integer of 0 to 4; and $R_{52}$ and $R_{53}$ are each independently an alkyl group having 1 to 6 carbon atoms, a halogen group, a hydroxyl group, a carboxyl group, or a trifluoromethyl group.

2. A negative electrode mixture paste for an electrical storage device, comprising the polyimide binder precursor composition according to claim 1 and an active material comprising a silicon-containing material and/or a graphite.

3. A negative electrode for a power storage device comprising:

(a) an electrode active material layer comprising an active material comprising a silicon-containing material and/or a graphite, and a polyimide binder that is a heated product of a polyimide precursor in the polyimide binder precursor composition according to claim 1; wherein the polyimide binder binds the active material; and (b) a current collector.

4. A power storage device comprising the negative electrode for a power storage device according to claim 3.

5. A method for producing a negative electrode for a power storage device comprising the steps of:

casting or applying the negative electrode mixture paste according to claim 2 onto a current collector; and heating the applied layer of the negative electrode mixture paste to form a negative electrode active material layer.

6. A method for producing a power storage device, comprising the method for producing a negative electrode according to claim 5 as one step.

7. The polyimide binder precursor composition according to claim 1, wherein the aromatic diamine compound is selected from compounds represented by formula:

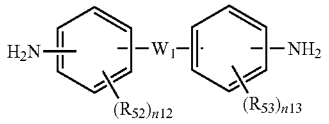

wherein $W_1$ is a divalent group selected from formula (5d):

(5d)

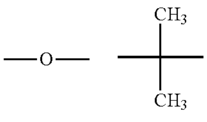

or a divalent group selected from formula (6):

(6)

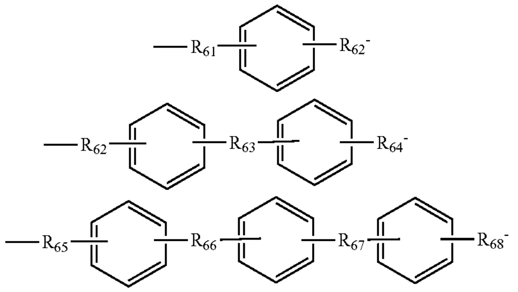

wherein $R_{61}$ to $R_{68}$ each independently represent any one of the divalent groups represented by formula (5d):

(5d)

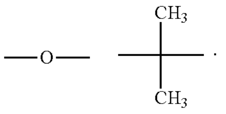

n12 and n13 each independently represent an integer of 0 to 4; and $R_{52}$ and $R_{53}$ are each independently an alkyl group having 1 to 6 carbon atoms.

8. The polyimide binder precursor composition according to claim 7, wherein n12 and n13 represent 0.

9. The polyimide binder precursor composition according to claim 1, wherein the alicyclic tetracarboxylic dianhydride is selected from the group consisting of cyclohexane-1,2,4,5-tetracarboxylic dianhydride (H-PMDA), 1,2,3,4-cyclobutanetetracarboxylic dianhydride (CBDA), norbornane-2-spiro-a-cyclopentanone-α'-spiro-2"-norbornane 5,5",6,6"-tetracarboxylic dianhydride (CpODA), (4arH, 8acH)-decahydro-1t,4t:5c,8c-dimethanonaphthalene-2t,3t,6c,7c-tetracarboxylic dianhydride (DNDAxx), bicyclo[2.2.2]oct-7-ene-2,3,5,6-tetracarboxylic dianhydride (BTA), [1,1'-bi(cyclohexane)]-3,3',4,4'-tetracarboxylic dianhydride (H-sBPDA), and (octahydro-1,3-dioxo-5-isobenzofurancarboxylic acid) 1,4-phenylenediamide (PPHT), and the aromatic diamine compound is selected from the group consisting of 4,4'-diaminodiphenyl ether (ODA), 1,3-bis(4-aminophenoxy)benzene (TPE-R), and 2,2-bis [4-(4-aminophenoxy)phenyl]propane (BAPP).

10. The polyimide binder precursor composition according to claim 1, wherein the diamine component consists essentially of the aromatic diamine compound.

11. The polyimide binder precursor composition according to claim 1, wherein the tetracarboxylic acid component consists essentially of the alicyclic tetracarboxylic dianhydride.

12. The polyimide binder precursor composition according to claim 1, wherein the polyimide binder has an irreversible capacity of 800 mAh/g or less.

* * * * *